United States Patent
Makino et al.

(10) Patent No.: US 7,558,974 B2
(45) Date of Patent: Jul. 7, 2009

(54) DISK ENCLOSURE

(75) Inventors: Tomoya Makino, Kawasaki (JP); Junichi Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 495 days.

(21) Appl. No.: 11/513,419

(22) Filed: Aug. 31, 2006

(65) Prior Publication Data
US 2007/0234081 A1    Oct. 4, 2007

(30) Foreign Application Priority Data
Feb. 14, 2006    (JP)    .............................. 2006-035886

(51) Int. Cl.
*G06F 1/16* (2006.01)

(52) U.S. Cl. ................ 713/300; 713/320; 713/321; 713/322; 713/323; 713/324; 713/330; 713/340; 710/74; 361/685; 361/788

(58) Field of Classification Search ................ 713/300, 713/320–324, 330, 340; 710/74; 361/685, 361/788
See application file for complete search history.

(56) References Cited

U.S. PATENT DOCUMENTS

| | | | | |
|---|---|---|---|---|
| 5,225,870 A | * | 7/1993 | Tanimoto et al. .............. 399/13 |
| 6,701,096 B2 | * | 3/2004 | Arai et al. ..................... 399/12 |
| 6,850,410 B2 | * | 2/2005 | Peeke et al. .................. 361/685 |
| 6,854,027 B2 | * | 2/2005 | Hsu et al. ...................... 710/74 |
| 6,910,083 B2 | * | 6/2005 | Hsu et al. ...................... 710/9 |
| 7,227,746 B2 | * | 6/2007 | Tanaka et al. ................ 361/685 |
| 2002/0164169 A1 | * | 11/2002 | Arai et al. ..................... 399/12 |
| 2003/0189811 A1 | * | 10/2003 | Peeke et al. .................. 361/685 |
| 2004/0267976 A1 | * | 12/2004 | Hsu et al. ...................... 710/9 |
| 2007/0064383 A1 | * | 3/2007 | Tanaka et al. ................ 361/685 |

FOREIGN PATENT DOCUMENTS

| | | |
|---|---|---|
| JP | 3-280261 | 12/1991 |
| JP | 2005-73340 | 3/2005 |

* cited by examiner

*Primary Examiner*—Abdelmoniem Elamin
(74) *Attorney, Agent, or Firm*—Staas & Halsey LLP

(57) ABSTRACT

In a detection element for the current which flows from a power source to a disk apparatus internal circuit, a plurality of resistors are incorporated such that the detection resistance for consumption current can be selected. Based on apparatus identification information from an apparatus identification unit 31 such as a current identification signal outputting circuit or an apparatus identification structure provided in a disk apparatus unit, the detection element switching circuit switches the detection resistance value of the detection element. A voltage detection circuit detects the potential difference between both terminals of the detection element. When a current control circuit detects an excessive current based on the potential difference, the current control circuit turns off a transistor (FET).

4 Claims, 5 Drawing Sheets

DISK ENCLOSURE

CROSS-REFERENCE TO RELATED APPLICATIONS

This application claims the conventional priority based on Japanese Patent Application Serial No.2006-035886, filed on Feb. 14, 2006, the disclosures of which are incorporated herein by reference.

BACKGROUND OF THE INVENTION

1. Field of the Invention

This invention generally relates to a disk enclosure for containing a plurality of disk apparatuses which constitute a RAID (Redundant Array Inexpensive Disks) apparatus and so on, and particularly to a disk enclosure which can detect excessive current appropriately for each of the contained disk apparatuses.

2. Description of the Related Art

A disk enclosure referred to as a device enclosure (DE) contains a plurality of disk apparatuses, has a function of supplying electric power to these disk apparatuses, and a HUB function for data interfaces. In a disk enclosure of this type, a current detection and control circuit is inserted between each of the disk apparatuses and a power source at the back panel. There are following two objects for which the current detection and control circuit is inserted.

One object is to enable insertion and removal of the disk apparatus with the disk enclosure which is activated by supplying of the power. The other object is to limit the range of an effect, in a case that a power fault (for example, excessive current due to a short circuit of a capacitor) is caused in one of the disk apparatuses. Examples of power faults actually occurred is such faults an excessive current protection circuit is activated at the power unit, thereby a power supply is cut off for whole of the disk enclosure.

FIG. 5 is a block diagram illustrating an example of the excessive current protection circuit of a conventional disk enclosure. In FIG. 5, reference numeral 1 denotes a power supply unit, reference numeral 2 denotes a back panel unit of a disk enclosure, and reference numeral 3 denotes a disk apparatus unit in which disk apparatuses are contained.

When a disk apparatus is inserted and connected to a connector 22, a power source 10 supplies the disk apparatus with electric power, through a connector 11, a current detection element (resistor) 200, a transistor (FET) 21, and the connector 22. In the normal condition, a current control circuit 24 keeps an FET 21 turned on. A voltage detection circuit 23 detects potential difference between both terminals of the detection element 200. Based on the potential difference detected by the voltage detection circuit 23, the current control circuit 24 determines whether or not the current which flows into the disk apparatus is within a predetermined design value of current carrying capacity (designed tolerance value). When the current control circuit 24 detects a current exceeding the designed tolerance value, the current control circuit 24 turns the FET 21 off to cut off the current flowing into the disk apparatus unit 3, thereby protecting a disk apparatus internal circuit 30 and so on.

Japanese Patent Laid-Open No.3-280261 and Japanese Patent Laid-Open No. 2005-73340 disclose other conventional techniques to detect an excessive current or to control a current which flows into a magnetic disk apparatus. However, these conventional techniques are to control the current which flows into single magnetic disk apparatus in which a design value of its consumption current is fixed, and do not have their objects, in a disk enclosure containing a plurality of disk apparatuses, to detect a current which flows from a common power source unit to each of the disk apparatuses, and to protect each of the disk apparatuses from the excessive current.

In a disk enclosure such as a RAID apparatus and so on, a current detection and control circuit detects whether or not a value of the current supplied from a common power source unit to each of the disk apparatuses is within a normal range respectively. In this detection, the respective values of the consumption current are different from every type of the disk apparatuses. A value of a resistor for current detection has to be made to fit to a type of the disk apparatus which has a maximum consumption current among the disk apparatuses to be used. This will cause some problems as follow.

First, in a case that the resistance value of the resistor for current detection is made to fit to a type of a disk apparatus which has the maximum consumption current, it can be detected such a fault mode without any problem that flows an excessive current caused by a short circuit between a power source and the ground with regard to a disk apparatus which has a small consumption current (tentatively referred to as a disk A). However, when a fault mode occurs in which a current that is excessively larger than the consumption current of the disk A flows, even the excessive consumption current may smaller than the design value. Therefore, the fault mode can not be detected.

Moreover, it is assumed that a consumption current of a newly developed disk apparatus will increase excessively which has not been commercialized at this moment. In this case, the disk enclosure cannot deal with the new disk apparatus.

SUMMARY OF THE INVENTION

It is an object of the present invention to provide a disk enclosure for containing a plurality of disk apparatus to realize enhancement of accuracy and function of a protection circuit which deals faults in a power system caused by a disk apparatus.

A disk enclosure of the present invention comprises a plurality of disk apparatuses connected to a power source which is common to the plurality of disk apparatuses, a detection element including a plurality of resistors detecting current which flows from the power source to the plurality of disk apparatuses, each of the plurality of resistors having different detection resistance values, a detection element switching circuit switching the detection resistance values with which the detection element detects the current base on a type of each of the plurality of disk apparatuses, a control circuit controlling connection or disconnection of the power source with the plurality of disk apparatuses based on comparison between a predetermined threshold value and the potential difference between both terminals of the detection element, and a switching circuit connecting or disconnecting the power source with the plurality of disk apparatuses based on an output of the control circuit.

Preferably, in one embodiment of the disk enclosure of the present invention, the detection element switching circuit switches the detection resistance values based on a plurality of apparatus identification signals inputted from the plurality of disk apparatuses Preferably, in one embodiment of the disk enclosure of the present invention, the detection element switching circuit switches the detection resistance values based on information obtained by determining the type of the disk apparatus according to the structure of a disk apparatus active frame.

Preferably, in one embodiment of the disk enclosure of the present invention, the detection element switching circuit switches the detection resistance values based on selection information determined by a higher level apparatus according to inquiry information stored in a disk medium.

According to the present invention, an abnormal detection current value can be set for each type of a disk apparatus. Consequently, an abnormal current value that does not reach a threshold value and has not been able to be detected becomes detectable. Therefore, the accuracy in abnormal current detection is enhanced. Moreover, even an already designed disk enclosure can deal with a disk apparatus, such as a new type, whose consumption current is unknown.

DETAILED DESCRIPTION OF THE PREFERRED EMBODIMENTS

The present invention realize, in a disk enclosure containing a plurality of disk apparatuses, a unit that switches a detection resistance value to detect a current which flows to respective disk apparatuses, as described below.

According to a first aspect of the present invention, a signal indicating a consumption current value of a disk apparatus is added to the disk apparatus. On the other hand, in a disk enclosure, a selection circuit is provided which selects a detection resistance value according to the signal. A signal line is added to the disk apparatus itself or an active frame (a case of the disk apparatus) for storing the disk apparatus.

According to a second aspect of the present invention, a structure which can identify a consumption current is added to the active frame of the disk apparatus. In a disk enclosure, a circuit (for example, any device such as a switch, a sensor, or a reader is acceptable) that can identify the structure is provided as a selection circuit to select a detection resistance value.

According to a third aspect of the present invention, inquiry information for a disk apparatus is obtained from a higher level apparatus such as a RAID controller. A database stores information on each of consumption currents in each of disk apparatuses. And, the higher level apparatus issues to a disk enclosure a selection instruction for selecting consumption current and a resistance value, thereby switching the detection resistance value.

Figure 1:
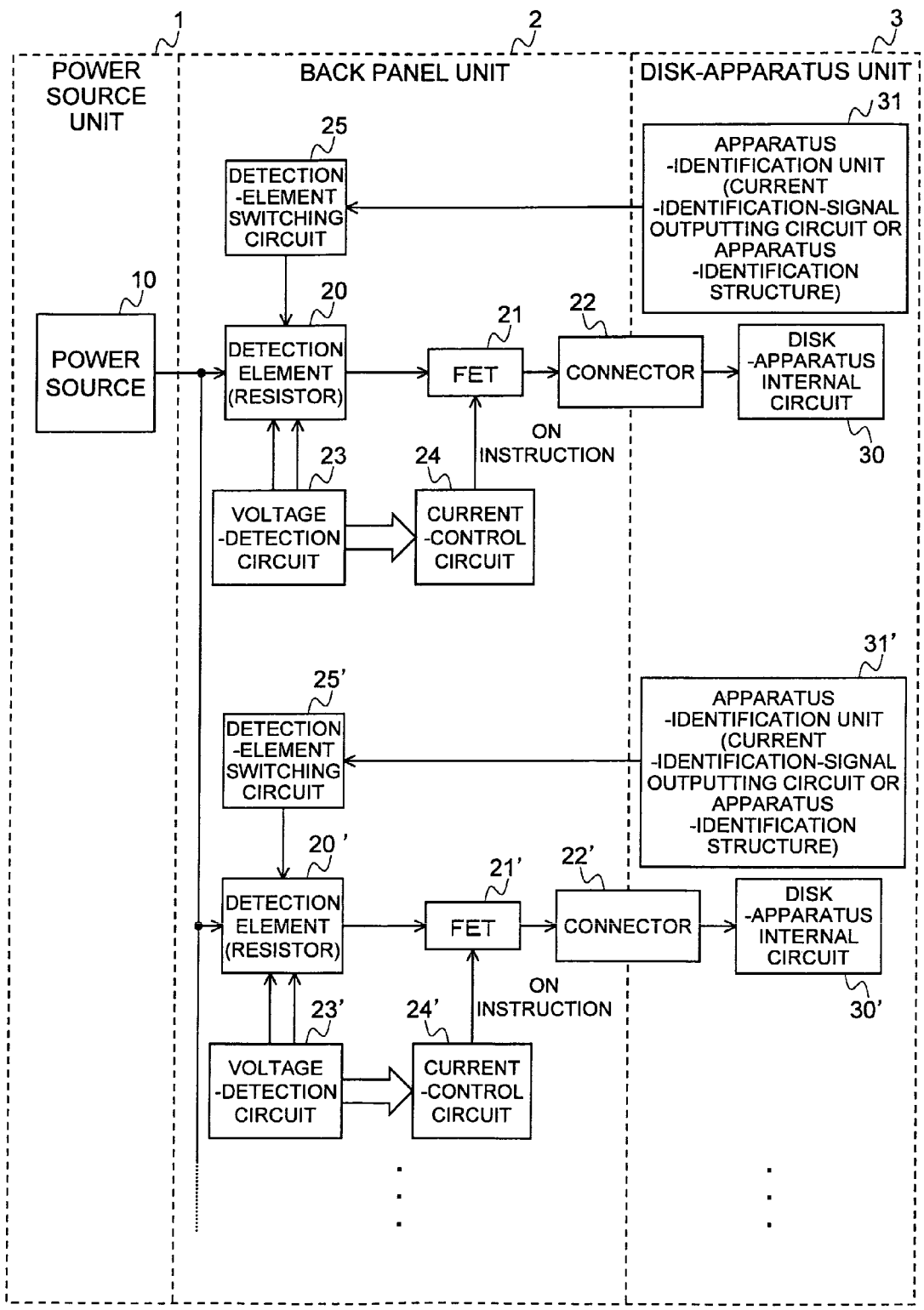
FIG. 1 is a block diagram illustrating an example of a structure of a disk enclosure according to the present invention.

FIG. 1 is a block diagram illustrating an example of a structure of a disk enclosure according to the present invention. In FIG. 1, reference numeral 1 denotes a power source unit, reference numeral 2 denotes a back panel unit of the disk enclosure, and reference numeral 3 denotes a disk apparatus unit in which disk apparatuses are contained.

When a disk apparatus is inserted and connected to a connector 22, a power source 10 supplies the disk apparatus with electric power through a current detection element (resistor) 20, a transistor (FET) 21, and the connector 22. In the normal condition, a current control circuit 24 keeps the FET 21 turned on. A voltage detection circuit 23 detects a potential difference between both terminals of the detection element 20. Based on the potential difference detected by the voltage detection circuit 23, the current control circuit 24 measures and determines whether or not current which flows into the disk apparatus is within a predetermined design value of current carrying capacity (designed tolerance value). When the current control circuit 24 detects a current exceeding the designed tolerance value, the current control circuit 24 turns the FET 21 off to cut off the current flowing into the disk apparatus unit 3, thereby protecting a disk apparatus internal circuit 30 and the like.

In the present invention, in order to deal with a plurality types of disk apparatuses which have different consumption currents with each other, the resistance value of the detection element 20 can be switched according to a type of a disk apparatus. The detection element switching circuit 25 identifies a current value suitable for a disk apparatus to be connected thereto by an apparatus identification unit 31, and switches the resistance value of the detection element 20. To realize the apparatus identification unit 31, a method may be used in which, by using a current identification signal outputting circuit, the disk apparatus unit 3 notifies the detection element switching circuit 25 of the designed tolerance value of consumption current. Further, a method may be used in which, by using a circuit which can determine an apparatus identification structure and is constituted by switches, sensors, readers and so on, the detection element switching circuit 25 can identify the designed tolerance value of a predetermined consumption current based on a structure of an active frame of the disk apparatus.

Moreover, instead of the foregoing electrical or mechanical identification unit, a method may be used described below. That is, information on the designed tolerance values of the consumption currents or types of the disk apparatuses and so on is preset as one of inquiry information which is recorded in various kinds of medium stored in the disk apparatus. Then, a higher level apparatus determines the above information, and notifies the detection element switching circuit 25 of the above information.

The foregoing circuit is provided in each disk apparatus that can be inserted into the disk enclosure.

Figure 2A:
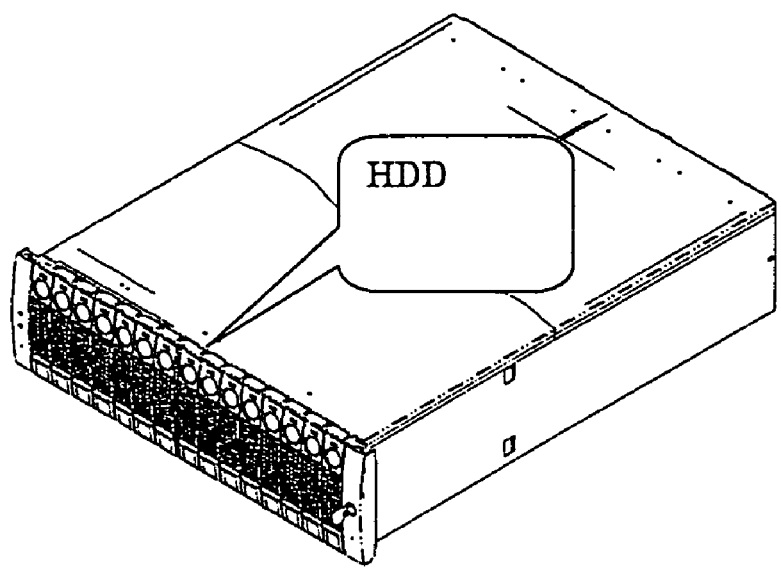
FIGS. 2A and 2B are external views of a disk enclosure to which the present invention is applied.
Figure 2B:
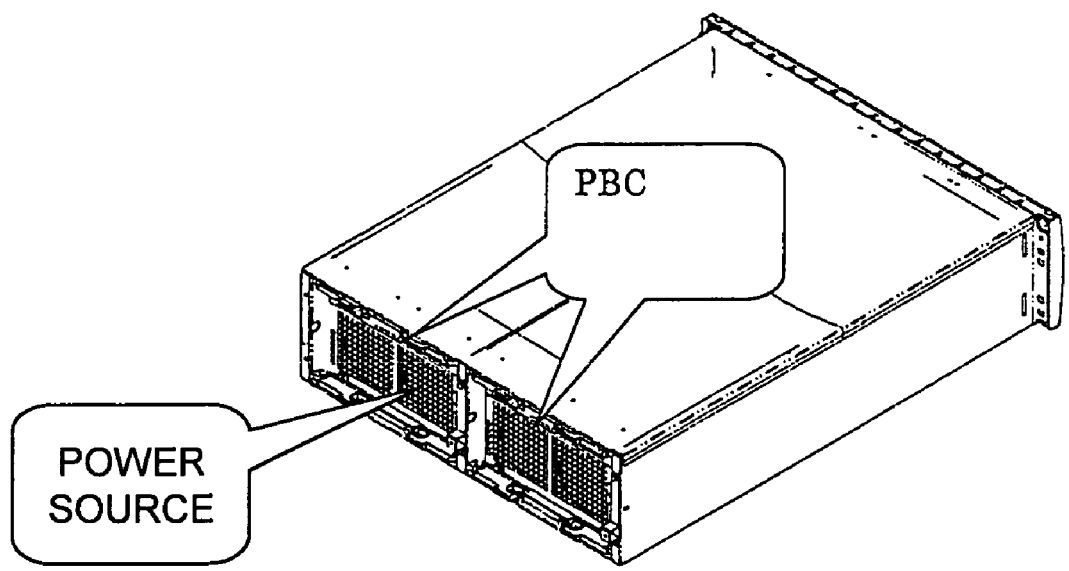

FIG. 2 is a set of external views of a disk enclosure to which the present invention is applied. FIG. 2A is a view of a disk enclosure viewed from front. A plurality of disk apparatuses (HDDs) contained in the active frame, or as many disk apparatuses as necessary, can be inserted into the disk enclosure. FIG. 2B is a view of a disk enclosure viewed from rear. On the rear surface of the disk enclosure, a power source unit, a PBC (Port Bypass Circuit) and so on are arranged.

Figure 3:
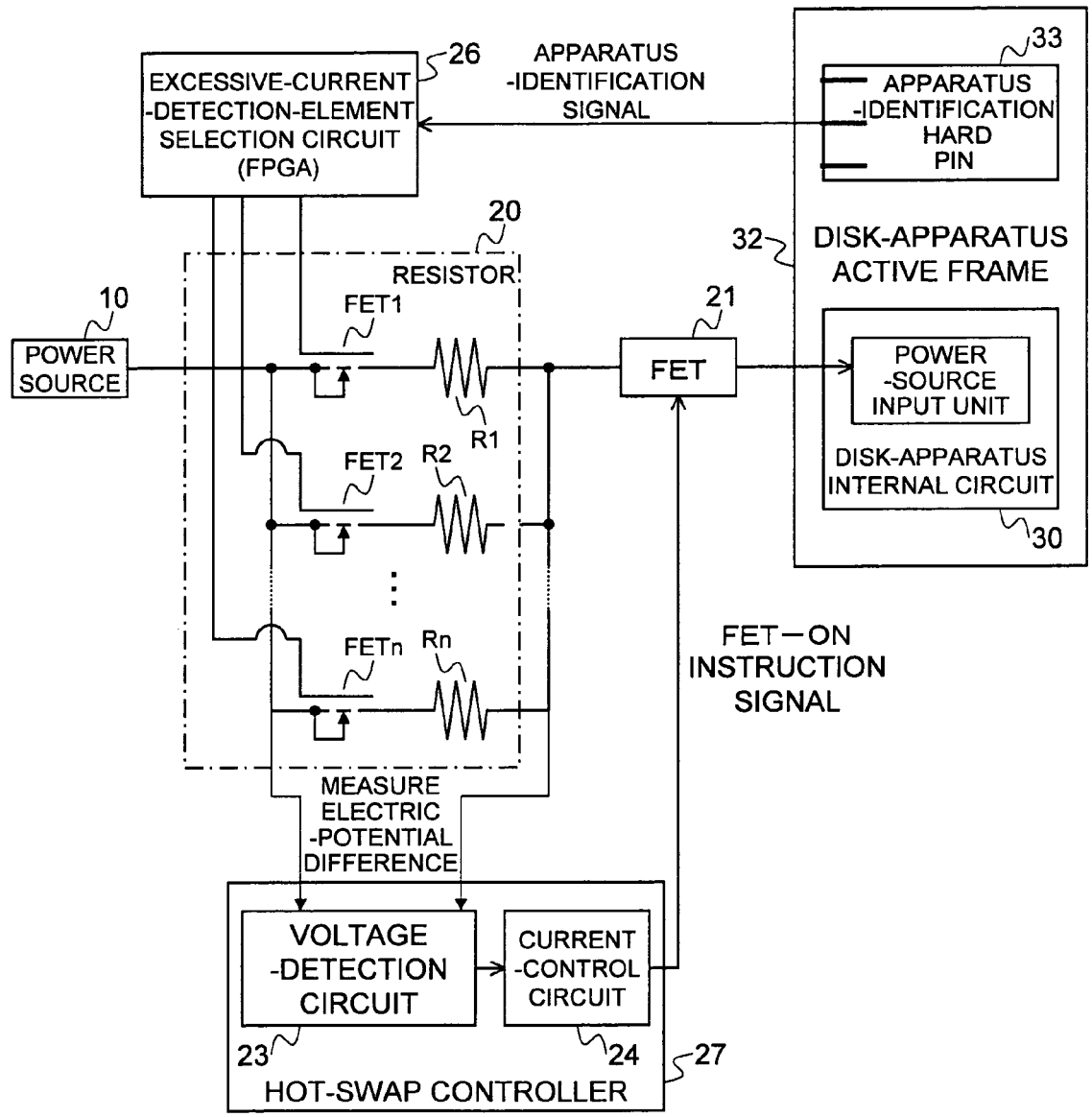
FIG. 3 is a block diagram illustrating an embodiment of the present invention.

A first embodiment of the present invention is described hereinafter. FIG. 3 is a block diagram illustrating an example of the present invention. In FIG. 3, an element having reference numeral which has the same reference numeral shown in FIG. 1 corresponds to the element illustrated in FIG. 1. An excessive current detection element selection circuit 26 is constituted of an FPGA (Field Programmable Gate Array) and corresponds to the detection element switching circuit 25 illustrated in FIG. 1. A hot swap controller 27 is a control circuit enabling insertion and removal of a disk apparatus while the disk enclosure is supplied with electric power and in the active state.

A disk apparatus active frame 32 is a case of the disk apparatus to insert and remove the disk apparatus while the disk enclosure is in the active state. In the first embodiment, as the apparatus identification unit 31 illustrated in FIG. 1, apparatus identification hard pins 33 are provided on the disk apparatus active frame 32.

As the detection element 20, a configuration is employed in which series circuits are arranged in parallel to one another, and each of series circuits comprises one of n transistors FET1 to FETn and one of n resistors R1 to Rn having resistances that are different from each other. The excessive current detection element selection circuit 26 receives an apparatus identification signal created according to the pin arrangement of the apparatus identification hard pins 33 which are provided with a disk apparatus in the disk apparatus active frame 32. Then, the circuit 26 identifies at the FPGA the type of the disk apparatus, and turns on any one or more of the transistors FET1 to FETn arranged in the detection element 20, thereby connecting resistors R1 to Rn required for detecting an excessive current to the respective series circuits.

The voltage detection circuit 23 built in the hot swap controller 27 detects the potential difference between both terminals of the parallel resistors which received the ON instruction, and activates the current control circuit 24. In other words, a detection value of an excessive current is set based on the synthesis resistance value of the parallel resistors which are connected when the transistors FET1 to FETn are turned on.

When the potential difference between the both terminals is the same with or smaller than a predetermined threshold value of the designed tolerance value in the hot swap controller 27, the current control circuit 24 outputs to the transistor 21 a FET-ON instruction signal, thereby connecting the power source 10 with the power source input unit of the disk apparatus internal circuit 30. On the contrary, when the potential difference between the both terminals is larger than the predetermined threshold value of the designed tolerance value, the current control circuit 24 turns the transistor 21 off, thereby disconnecting the power source 10 from the power source input unit of the disk apparatus internal circuit 30.

Here, it is assumed that, when the voltage detected by the voltage detection circuit 23 is the same with or larger than "V", the current control circuit 24 turns the transistor 21 off. In this case, the excessive current detection element selection circuit 26 selects resistance values in such a way that the synthesis resistance value $R_k$ of the detection element 20 becomes $V/I_k$, where $I_k$ is the designed tolerance value for the current consumed by an inserted disk apparatus. Due to this selection, voltage detected by the voltage detection circuit 23 as an excessive current can be a constant voltage value V. Therefore, the configurations of the voltage detection circuit 23 and the current control circuit 24 can be simplified.

Figure 4:
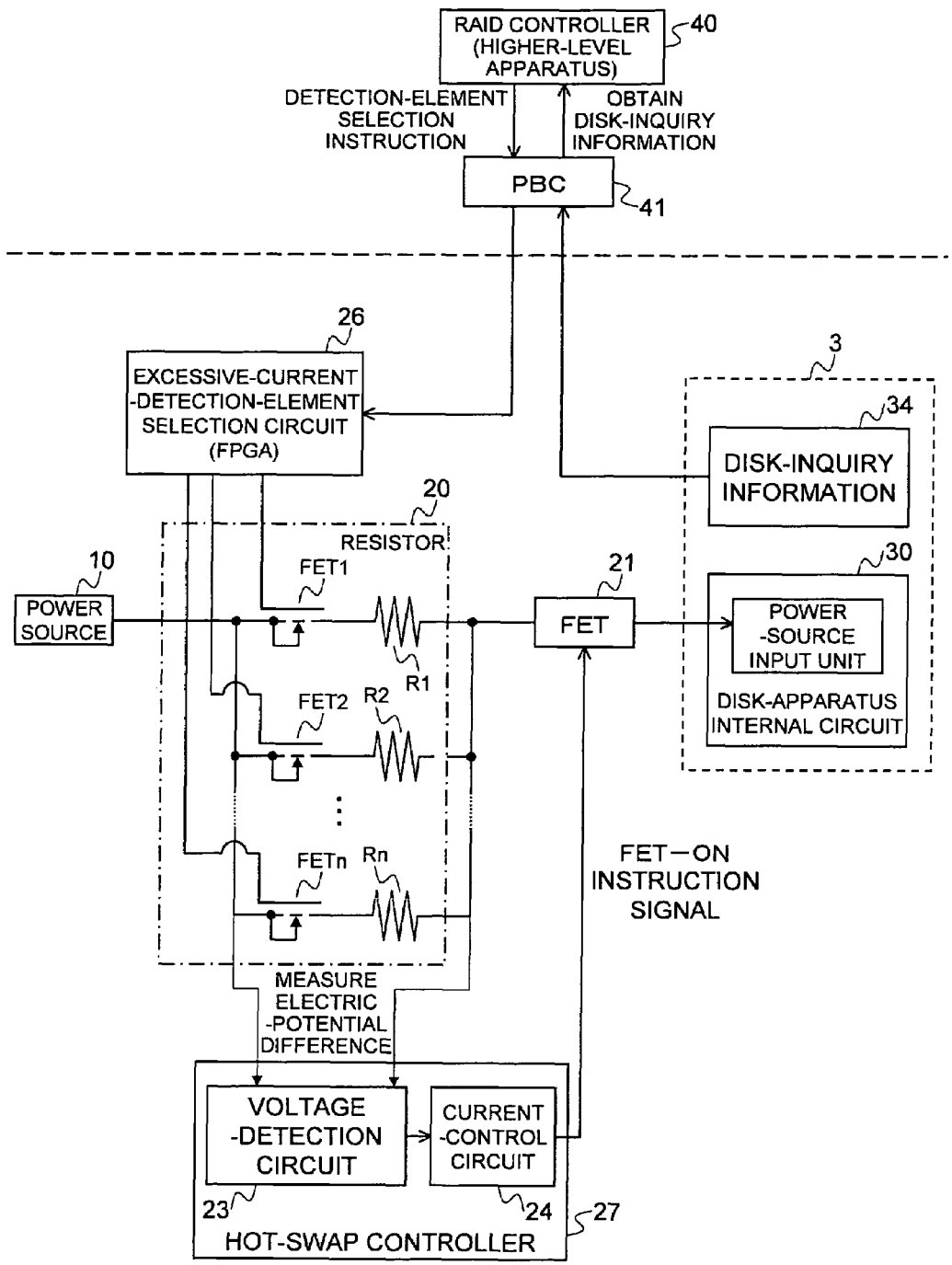
FIG. 4 is a block diagram illustrating another embodiment of the present invention.
Figure 5:
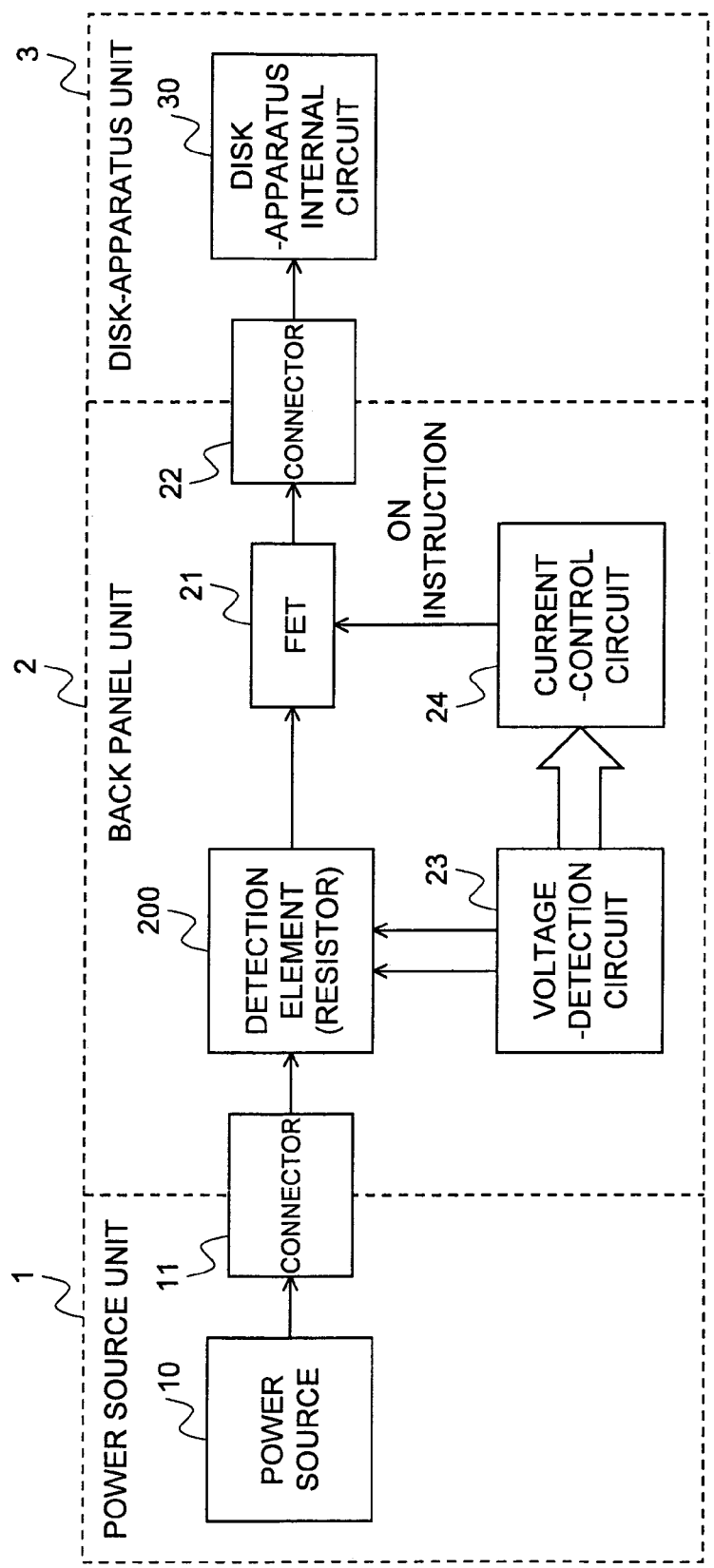
FIG. 5 is a block diagram illustrating an example of a conventional technique.

A second embodiment of the present invention is described hereinafter. FIG. 4 is a block diagram illustrating another example of the present invention. With regard to the second embodiment, the difference between the second embodiment and the first embodiment described above is mainly explained.

A disk enclosure according to the second embodiment is utilized for containing a plurality of disk apparatuses for a RAID system. Here, a RAID controller 40, which is a higher level apparatus, obtains through a PBC 41 disk inquiry information 34 which is written in a disk medium in advance according to a type of a disk apparatus. Then, the controller 40 sends through the PBC 41 a selection instruction of a detection element to the excessive current detection element selection circuit 26 based on the disk inquiry information 34. The circuit 26 switches the detection resistance value of the detection element 20 based on the selection instruction. Other configuration and operation are the same with the configuration and operation of the first embodiment described above.

What is claimed is:

1. A disk enclosure, comprising:
a plurality of disk apparatuses connected to a power source which is common to the plurality of disk apparatuses;
a detection element including a plurality of resistors detecting current which flows from the power source to the plurality of disk apparatuses, each of the plurality of resistors having different detection resistance values;
a detection element switching circuit switching the detection resistance values with which the detection element detects the current base on a type of each of the plurality of disk apparatuses;
a control circuit controlling connection or disconnection of the power source with the plurality of disk apparatuses based on comparison between a predetermined threshold value and the potential difference between both terminals of the detection element; and
a switching circuit connecting or disconnecting the power source with the plurality of disk apparatuses based on an output of the control circuit.

2. The disk enclosure according to claim 1, wherein the detection element switching circuit switches the detection resistance values based on a plurality of apparatus identification signals inputted from the plurality of disk apparatuses.

3. The disk enclosure according to claim 1, wherein the detection element switching circuit switches the detection resistance values based on information obtained by determining the type of the disk apparatus according to the structure of a disk apparatus active frame.

4. The disk enclosure according to claim 1, wherein the detection element switching circuit switches the detection resistance values based on selection information determined by a higher level apparatus according to inquiry information stored in a disk medium.

* * * * *